United States Patent Office 3,375,268
Patented Mar. 26, 1968

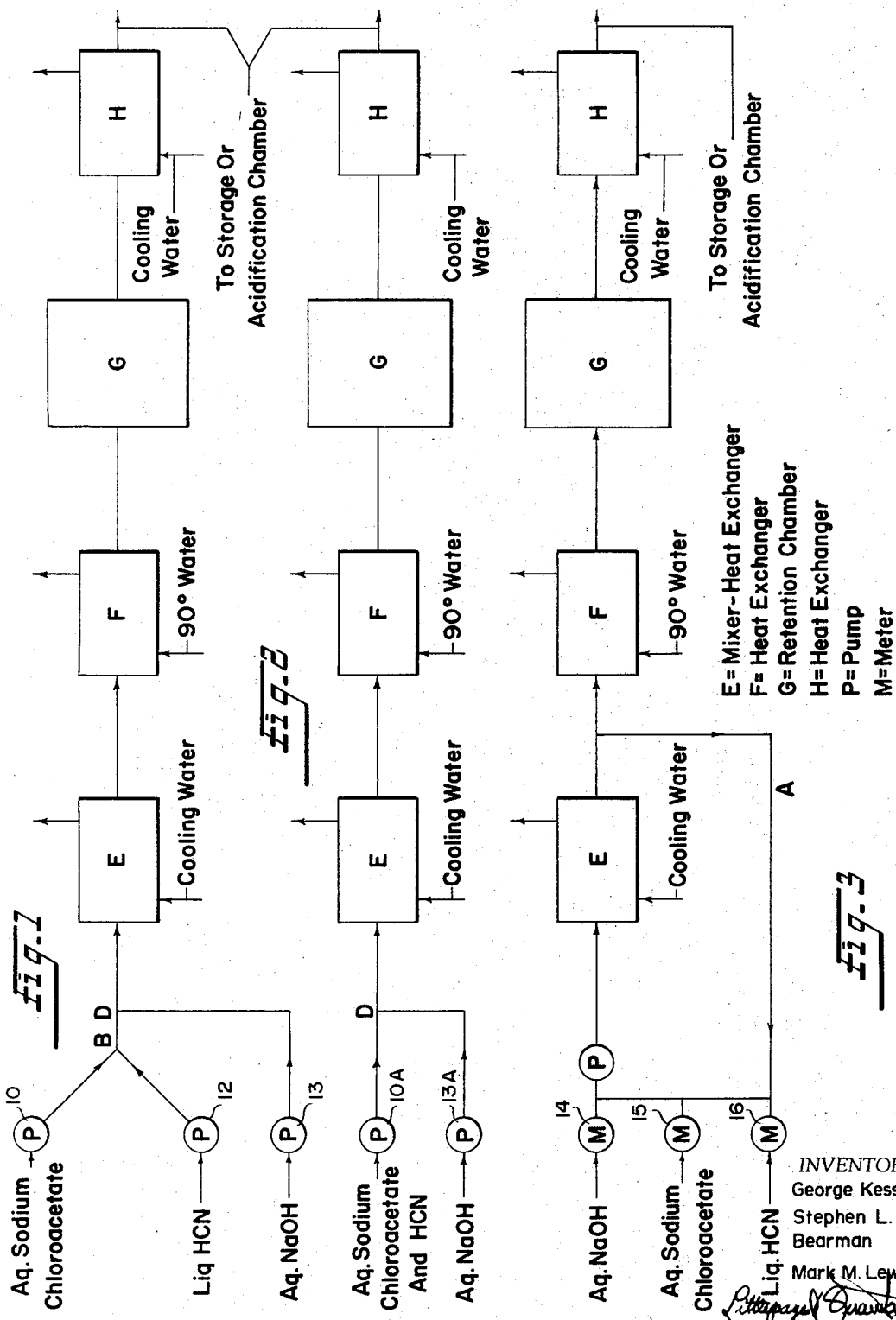

3,375,268
PROCESS FOR PRODUCING
CYANOACETIC ACID
George Kesslin, Teaneck, N.J., and Stephen L. Bearman and Mark M. Lewis, New City, N.Y., assignors to Kay-Fries Chemicals, Inc., West Haverstraw, N.Y., a corporation of New York
Filed Aug. 27, 1964, Ser. No. 392,394
6 Claims. (Cl. 260—465.4)

This invention relates to an improved process for producing sodium cyanoacetate and cyanoacetic acid, and more particularly, to a more economical continuous process for producing these compounds in high yields.

It is known that sodium cyanoacetate can be prepared by reacting sodium chloroacetate and sodium cyanide in an aqueous solution. The reaction is exothermic and proceeds so rapidly at temperatures above 80° C. that the solution begins to boil in a short time. By the known procedures, hydrocyanic acid is liberated by the hydrolysis of sodium cyanide; this is especially true if one works with an excess of sodium cyanide.

If the starting materials set out above are put in the aqueous solution batch-wise, the preparation of the sodium cyanoacetate is technically difficult to carry through. One must take care to have good cooling and tight apparatus in spite of these precautions some loss of hydrogen cyanide is unavoidable, and the temperature must be kept below 95° C. because at higher temperatures undue polymerization losses occur.

If the starting materials are put in the aqueous solution continuously a series of competing reactions greatly reduce the yield and efficiency of the process. The process of German Patent 1,029,361 is the only continuous cyanoacetate producing process known to us and it illustrates the difficulties caused by the competing reactions and the procedures used by the prior art to overcome the competing reactions. Using this procedure only very small thin layers of the equimolecular starting solution are very rapidly heated to high temperatures, concentrated and rapidly cooled. Since the hydrolysis of the sodium cyanide is a time reaction, this procedure minimizes the formation of free hydrogen cyanide markedly. The chief disadvantages of this process are that the solutions must be heated and reacted within 45 seconds and then the solutions must be cooled in the shortest time possible to prevent side reactions caused by hydrolysis of sodium cyanide. This reference shows that the reacted solutions must be heated within 45 seconds and cooled and concentrated in less than 60 seconds by simultaneously rapidly vacuum evaporating the water and cooling the solution. These specific process steps greatly increase the cost of the process.

In the reaction described above, the aqueous solution of sodium chloroacetate reacts with the aqueous solution of sodium cyanide at temperatures in the range of 50 to 100° C. to form cyanoacetate in the manner shown in Equation 1.

(1) $NaOOCCH_2Cl + NaCN \rightarrow NaOOCCH_2CN + NaCl$ 

The sodium cyanide solution used to carry out this reaction must be prepared by adding HCN to an excess of NaOH and then crystallizing out the NaCN to separate it from the excess caustic. This procedure must be followed exactly because unless an excess of caustic is present the HCN will polymerize to form dark colored resinous bodies. The crystallized NaCN produced may then be used to make up fresh solutions of NaCN for use in Reaction 1. Alternately HCN can be carefully added to caustic to produce NaCN solution containing 27–30% NaCN with as little as 1% caustic in the final solution without encountering excessive polymerization of the HCN. Since the NaCN solution will slowly decompose it must be used at once. When freshly prepared, the solution can be used in Reaction 1; however, the excess NaOH present causes side reactions that lower the yield of sodium cyanoacetate based upon the sodium chloroacetate consumed and the side reaction by-products interfere with the extraction process described in U.S. Patent 2,480,380.

In summation, the prior art teaches that in reacting HCN with caustic, a substantial excess of NaOH must be maintained to prevent polymerization of HCN, and that sodium cyanide containing a substantial excess of NaOH will, when reacted with sodium chloroacetate, result in substantial formation of sodium glycollate thus lowering the yield and contaminating the resulting sodium cyanoacetate solution with sodium glycollate in the manner shown in Equation 2.

(2) $NaOH + NaOOCCH_2Cl \rightarrow NaCl + NaOOCCH_2OH$ 

In the United States HCN has become commercially available and it is widely used industrially to prepare sodium cyanide. Increased yields and substantial savings in raw material costs would be possible if HCN, caustic and sodium chloroacetate could be reacted to form sodium cyanoacetate without the necessity of first isolating sodium cyanide.

Thus it is an important object of this invention to provide a simplified and more economical continuous process for producing sodium cyanoacetate and cyanoacetic acid.

Another important object of this invention is to provide a simplified method of reducing the hydrolysis of NaCN and polymerization of HCN in such a process.

Another important object of this invention is to provide a method of producing increased yields of sodium cyanoacetate and cyanoacetic acid.

Another important object of this invention is to reduce the production of sodium glycollate impurities in the production of sodium cyanoacetate.

Other objects and advantages of this invention will appear in the following description of the preferred embodiments thereof given in connection with the examples, drawings and claims.

FIGURE 1 shows a flow diagram of one preferred embodiment of the invention;

FIGURE 2 shows a flow diagram of a second preferred embodiment of the invention; and FIGURE 3 shows a flow diagram of a third preferred embodiment of the invention.

We have discovered that in the presence of neutral or slightly acidic sodium chloroacetate solution, NaOH or caustic can be added to and reacted with HCN in approximately equivalent amounts at temperatures in the range of approximately 25–40° C. without measurable polymerization of HCN, and that a solution prepared and reacted in this manner when heated to 50–100° C. will react in the manner shown in Equation 1 to produce sodium cyanoacetate in pratically theoretical yields. We have also found that in the temperature range of 25–40° C. the reaction of caustic with HCN proceeds rapidly whereas the reaction of Equation 2 proceeds very slowly, if at all.

Contrary to the teaching in German Patent 1,029,361, we have found that there is no need to carry out the apparent reaction of Equation 1 in 30 to 45 seconds in the process of this invention. Actually, to obtain a complete reaction and optimum yields the reaction time should preferably be in the order of 10 to 15 minutes at a temperature in the approximate range of 80 to 120° C.

We have found that to obtain a substantially complete reaction in the formation of sodium cyanoacetate (a) a 2 to 5% excess of sodium cyanide is required; (b) the NaOH must be added to the HCN and the sodium hydroxide must be of such a concentration that when reacted with the sodium chloroacetate solution, which may be of a concentration of up to 42% by weight, that the concentration of the resulting sodium cyanoacetate solution will not be above 25%; (thus, when the concentration of the sodium chloroacetate solution is 42%, the corresponding concentration of the sodium hydroxide solution will be 31% in order to give a sodium cyanoacetate solution of 25% concentration), and (c) the quantities of HCN and NaOH be within ½ of one percent equimolar. If excess HCN is present it will polymerize to give a dark colored solution from which it is difficult to obtain pure cyanoacetic acid, and if an excess of caustic is present excessive amounts of sodium glycollate are formed.

Even if the limitations of steps (a) to (c) are not strictly complied with, the process sequence of this invention will produce yields as high as and higher than the prior art in a more economical continuous manner.

Unlike the German process where a dry mixture of sodium chloride and sodium cyanoacetate is desired we use the crude reaction mixture to produce pure cyanoacetic acid. The excess NaCN is destroyed on acidification and does not interfere with the reaction. In the German process the excess sodium cyanide may be an undesirable contaminant. This may be the reason the German patent does not claim yields or recognize the necessity of having an excess of sodium cyanide to achieve optimum yields.

The reactions of this invention can be carried out batchwise as long as the temperature and time limitations indicated are observed; however, it is more practical to control the temperatures if the reaction is carried out in a continuous process.

A preferred method of carrying out the process can best be described by reference to the flow diagram shown in FIGURE 1.

An aqueous solution of 42% sodium chloroacetate at 25–35° C. is introduced through a proportioning pump or some other suitable metering device at 10. Liquid HCN at 15–20° C. is added in 5% excess through proportioning pump 12 at B. From proportioning pump 13 an aqueous solution of 31% NaOH is introduced at D in the exact equivalent molar amount required to react with the HCN. The mixture enters the mixer-heat exchanger E in which the temperature is held at 25–40° C. The size of this heat exchanger is so proportioned that the dwell time is as low as practicable. The mixture next flows to heat exchanger F where it is rapidly brought to 90° C. The dwell time in F is of the order of 1–2 minutes and here the major part of the heat formed during the reaction is removed. The reaction is 75–80% complete when the mixture enters retention chamber G, where the reaction is completed and in which the dwell time is in the range of 10–15 minutes at temperatures of 85–120° C. The mixture is then passed through heat exchanger H where it is cooled to 25–40° C. and sent to either a sodium cyanoacetate storage area or to an acidification chamber.

The effluent solution contains sodium cyanoacetate, sodium chloride, sodium cyanide and sodium glycollate. The yields of sodium cyanoacetate are in the range of 96–98% of the theoretical yield based upon the sodium chloroacetate. The sodium cyanide is largely the excess introduced. The sodium glycollate amounts to 1–2% of the sodium chloroacetate used. The solution is pale straw to colorless, and is ready for acidification and extraction of the cyanoacetic acid in a known way.

The examples that follow illustrate preferred methods of performing the process of this invention and the excellent yields that are obtained.

*Example 1*

One and five hundredths (1.05) g. mols of HCN, and 1.05 mols of NaOH in the form of a 31% aqueous solution are added to a 42% solution of sodium chloroacetate with a pH of 6.5 containing one gram mol of chloroacetic acid always keeping the HCN addition 0–10% ahead of the NaOH. The heat of reaction was removed by immersing the reactor in an ice bath to keep the temperature in the range of 35–40° C. After about 30 minutes the addition was completed and the mixture was heated to 55° C. Again the reactor was immersed in a cooling bath to prevent the temperature from exceeding 55° C. After three hours at 55° C. the mixture was cooled to room temperature.

Analysis of the mixture for sodium cyanoacetate indicated a yield of 93% of the theoretical yield based upon the sodium chloroacetate used. In order to obtain the highest yield it is important that the addition of HCN and NaOH be completed in the minimum time consistent with removal of the heat formed in the reaction. For example, extending the time of addition from 30 minutes to 2½ hours resulted in lowering the yield to 90.8%.

*Example 2*

While the process of this invention can readily be carried out by the preferred method described above and illustrated in FIGURE 1, as an alternative procedure, the sodium chloroacetate solution can be prepared and the correct amount of HCN weighed out and added batchwise. As shown in FIGURE 2 this sodium chloroacetate-HCN solution can then be added through proportioning pump 10–A, at D eliminating one proportioning pump. The aqueous 31% NaOH solution is introduced at D, through proportioning pump 13–A in the exact equivalent molar amount to react with the HCN. When using this sequence of steps it is important that the sodium chloroacetate solution be slightly acidic. Thus a solution was made containing 390.2 g. of sodium chloroacetate, 6.5 g. of chloroacetic acid and 97.8 g. of HCN in 505.5 g. of water. Another solution was made containing 147.9 g. of NaOH in 314.2 g. of water. These solutions were passed into a continuous reactor consisting of three heat exchangers in series using small proportioning pumps. This sequence is shown in the flow diagram of FIGURE 2.

The pumps were set to deliver .0822 g. mols of sodium chloroacetate, .0017 g. mols of chloroacetic acid and .0890 g. mols of HCN per minute through one pump and .0907 g. mols of NaOH per minute through the other pump. Cooling water was adjusted to keep the temperature of the mixture leaving E at 30–40° C. The dwell time in E was 25 seconds. The flow of water having a temperature of 90° C. was adjusted to keep the temperature of the mixture leaving F at approximately 85–120° C. and with a dwell time of up to 2 minutes. Chamber G was of a size that permitted a dwell time of 10–15 minutes therein at 85–120° C. The flow of cooling water to H was adjusted to keep the temperature of the mixture leaving H approximately 25–30° C. Dwell time in H was approximately 25 seconds. Analysis of the stream leaving H indicated a yield of 98% of theory of sodium cyanoacetate based on the total chloroacetic acid fed into the system or 0.822 g. mols of sodium cyanoacetate per minute. The solution leaving the apparatus was water white to pale straw in color and was suitable for acidification and extraction by methods disclosed in U.S. Patent 2,480,380.

Obviously other procedures that may be employed to carry out this invention will occur to those skilled in the art. For example, the sodium chloroacetate solution, liquid HCN and sodium hydroxide solutions may be metered continuously by using suitable metering devices, mixing chambers and heat exchangers as shown in FIGURE 3. In this case, the three components are mixed thoroughly by metering through meters 14, 15, 16 into a recycle stream circulating at from 3 to 10 times the combined feed rate. In this case, the mixer, heat exchanger E, and all other components F, G and H, serve as described previously. The solution of sodium cyanoacetate-sodium chloride resulting from the above procedures may be employed for purposes other than acidification and extraction.

The discussion has been limited to the use of the most economically known starting compounds that may be used in the process of this invention, but other chemical equivalents may be substituted for these starting compounds. For example, other alkali metal hydroxides such as KOH may be substituted for NaOH; and chloroacetic acid or alkali metal salts, such as potassium chloroacetate or other equivalent halogen compounds, such as sodium bromoacetate, may be substituted for the sodium chloroacetate. The claims below are to be interpreted in view of these equivalents and the use of sodium chloroacetate in the claims is intended to include the equivalents listed above.

When chloroacetic acid is substituted for sodium chloroacetate it is essential to continuously neutralize not only the HCN, as outlined above, but also to continuously and simultaneously neutralize the chloroacetic acid. Using this modification of the invention the chloroacetic acid solution would be fed into the apparatus at the point where the sodium chloroacetate is admitted in the examples cited above. The HCN is then added and twice the molar amount of NaOH is added in the manner disclosed above since it must neutralize both the HCN and the chloroacetic acid.

The use of chloroacetic acid and twice the amount of NaOH would require a larger heat exchanger to remove the extra heat of neutralization. Otherwise the remainder of the equipment used would be the same.

Other modifications are contemplated and may obviously be resorted to by those skilled in the art without departing from the spirit and the scope of the invention as hereinafter defined in the appended claims.

What is claimed is:
1. A process for producing sodium cyanoacetate which comprises mixing in an aqueous reaction medium the reactants sodium chloroacetate and approximately equivalent amounts of hydrogen cyanide and an alkali metal hydroxide at a temperature between about 25–40° C. and continuing the reaction in said aqueous medium at a temperature between about 50–120° C. until the sodium cyanoacetate is formed.
2. The process of claim 1 in which the sodium cyanoacetate is acidified to cyanoacetic acid.
3. The process of claim 1 wherein the alkali metal hydroxide is NaOH.
4. The process of claim 1 wherein the hydrogen cyanide and the alkali metal hydroxide are present in molar proportions up to 5% more than the molar proportion of sodium chloroacetate.
5. The process of claim 1 wherein the alkali metal hydroxide is mixed with a mixture of sodium chloracetate and hydrogen cyanide.
6. The process of claim 1 wherein the reaction is continuous, the mixing taking place upstream and the continuation of the reaction taking place downstream.

References Cited
UNITED STATES PATENTS

| | | | |
|---|---|---|---|
| 2,338,834 | 1/1944 | Britton et al. | 260—465.4 |
| 2,480,380 | 8/1949 | Nicholl et al. | 260—465.4 |

FOREIGN PATENTS

| | | |
|---|---|---|
| 824,640 | 12/1959 | Great Britain. |

JOSEPH P. BRUST, *Primary Examiner.*

UNITED STATES PATENT OFFICE
CERTIFICATE OF CORRECTION

Patent No. 3,375,268                          March 26, 1968

George Kesslin et al.

It is certified that error appears in the above identified patent and that said Letters Patent are hereby corrected as shown below:

Column 4, line 59, "0.822" should read -- .0822 --.

Signed and sealed this 5th day of August 1969.

(SEAL)
Attest:

Edward M. Fletcher, Jr.                        WILLIAM E. SCHUYLER, JR.
Attesting Officer                               Commissioner of Patents